May 13, 1941.  J. D. YODER  2,241,873
WATER DEAERATING AND PURIFYING
Filed Oct. 8, 1937  3 Sheets-Sheet 1
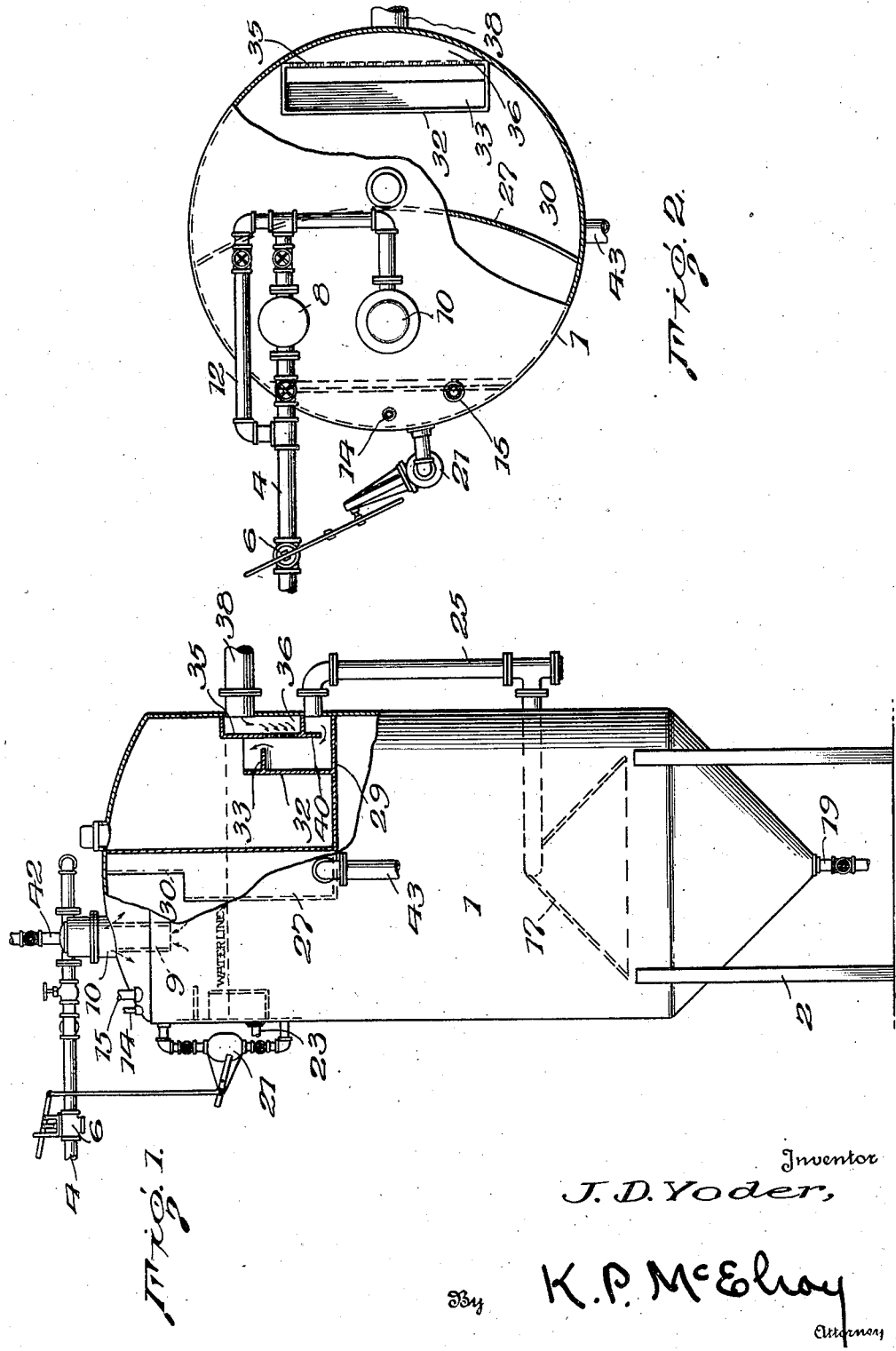

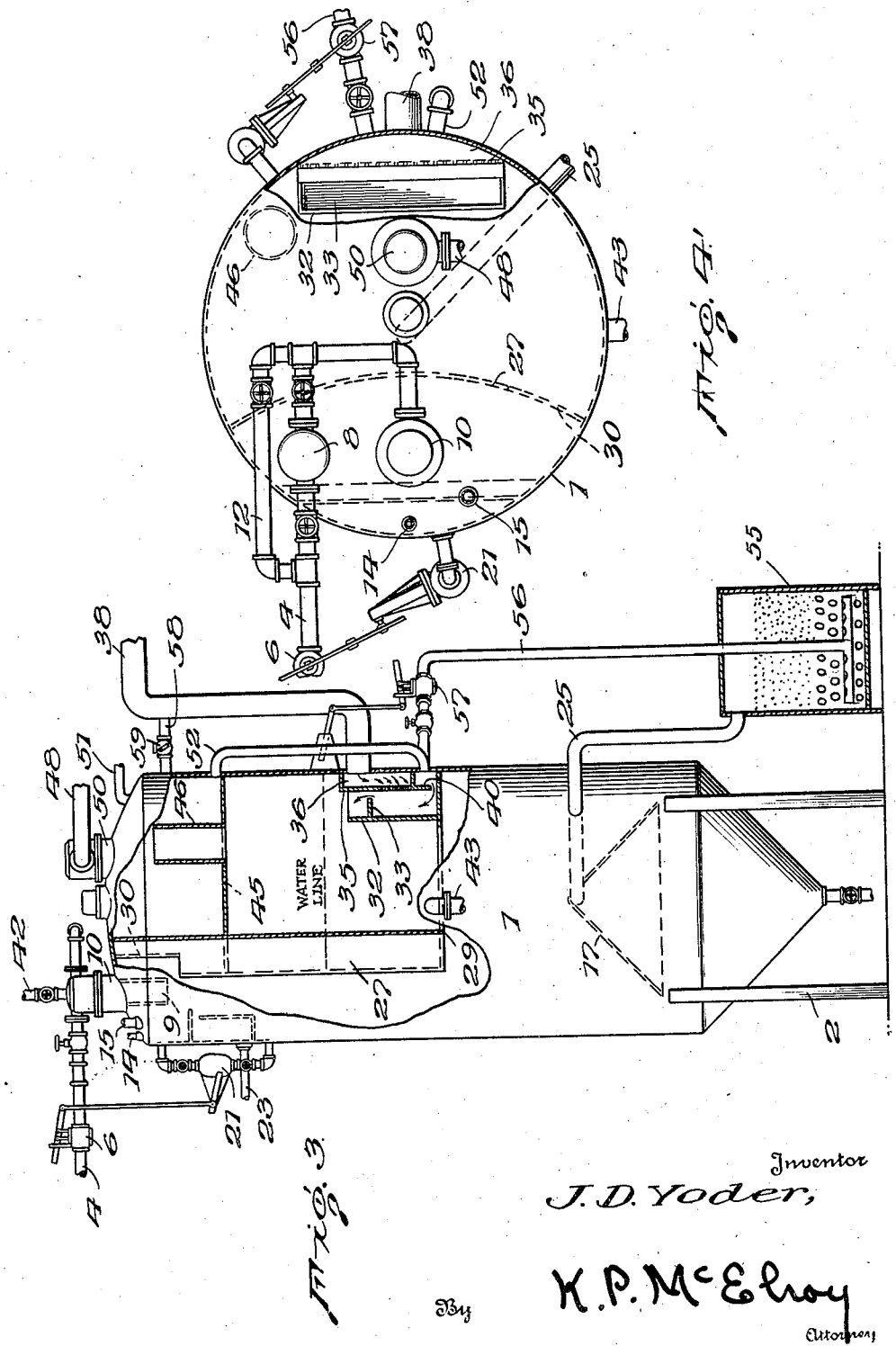

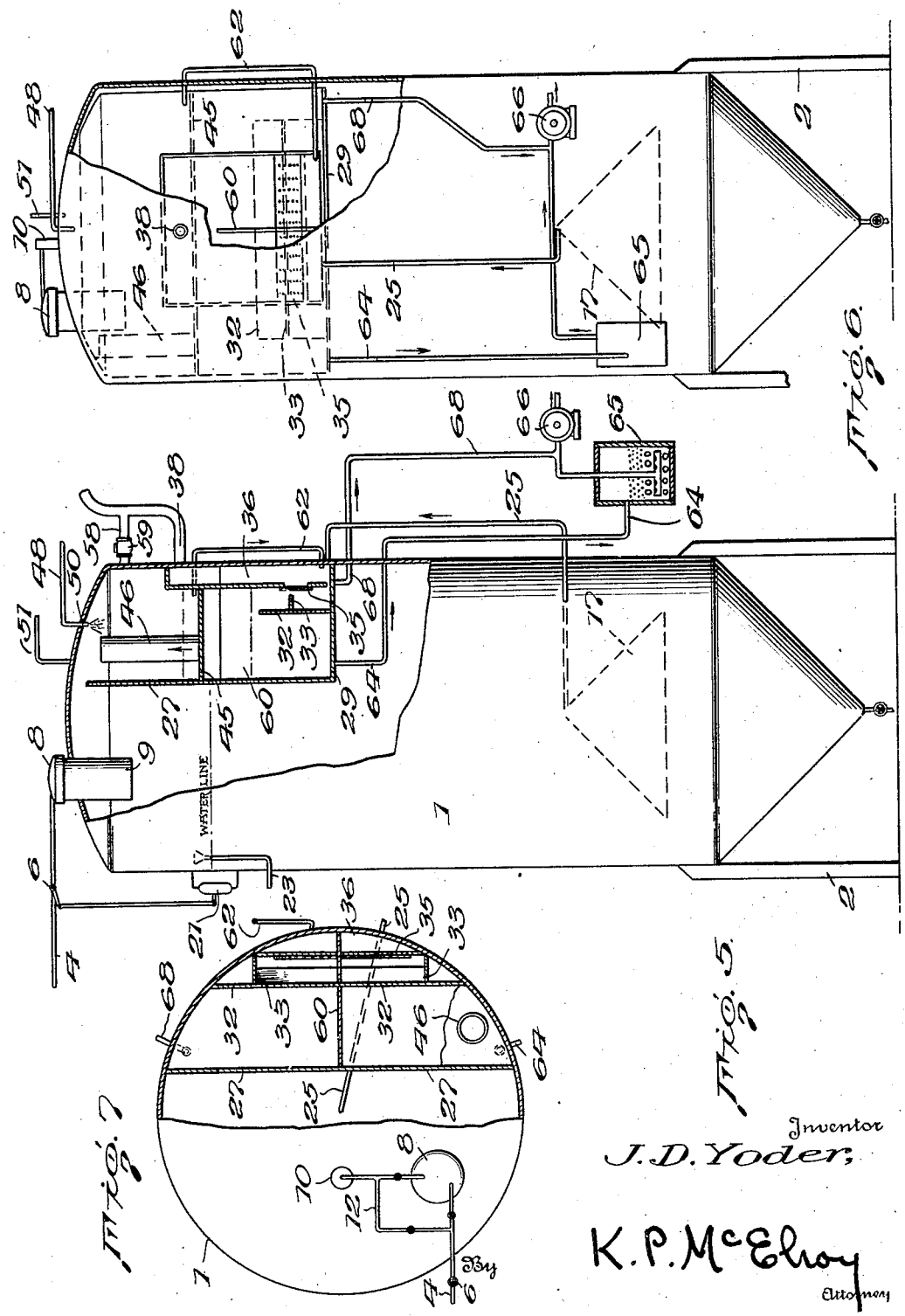

Patented May 13, 1941

2,241,873

UNITED STATES PATENT OFFICE 2,241,873

WATER DEAERATING AND PURIFYING

Joseph D. Yoder, Larchmont, N. Y., assignor to The Permutit Company, New York, N. Y., a corporation of Delaware Application October 8, 1937, Serial No. 168,079

11 Claims. (Cl. 210—12)

This invention or discovery relates to water deaerating and purifying; and it comprises apparatus for treating water to purify it in steam boiler feeding and like operations, wherein a sedimentation tank having water preheating means integral therewith and at least partially heated by steam condensation receives a flow of water through said preheating means and a feed of chemicals, and a deaerator compartment is defined by partitions segregating a portion of said sedimentation tank and is provided with means for delivering thereto water treated in another portion of said sedimentation tank or water at least partially purified elsewhere or both, said deaerator advantageously comprising a plate with rows of openings therein communicating with a steam supply and means for creating a substantially uniform flow of the water delivered to the deaerator past said openings whereby it is intimately contacted with a relatively large volume of steam, and means for utilizing the portion of said steam uncondensed in the deaerator to preheat the water; and my invention further comprises an improved method of treating water to purify and deaerate it; all as more fully hereinafter set forth and as claimed.

When utilizing water in steam boilers and various other industrial operations it is usually necessary to purify the raw water in various respects. Water for steam boiler use is generally softened, and it is also frequently desirable to deaerate boiler feed water to prevent corrosion in the boiler and in accessory apparatus such as economizers, preheaters, etc. For softening boiler feed water or make-up water the zeolite method or the lime-soda treatment are most frequently used. For deaeration of the water various devices have been used heretofore, some of which included means for chemical treatment of the water and sedimentation. However, such combined deaerators and softeners have not been entirely satisfactory from the standpoints of efficiency and economy.

In the operation of modern high pressure boiler plants, with purification of the feed water and removal of oxygen therefrom to protect the hot metal surfaces from corrosion, it is generally desired that the water after oxygen removal should have an oxygen content less than 0.03 cc. per liter or 4 parts per hundred millions by weight. In such removal, two factors are especially important. First, the temperature of the operation must be high enough to minimize solubility of oxygen or other gases in the water; and, secondly, the partial pressure of the oxygen or other removed gas in the atmosphere in contact with the water treated must be minimized. Obtaining accurate control of these factors and simultaneous efficiency in the heating required has presented considerable difficulty. An object achieved in the present invention is a maximum deaeration or removal of gases from water, coupled with a maximum efficiency and economy in utilizing steam for heating the water. A further achieved object is efficient heating and steam scrubbing for deaeration in combination with purification of the water by chemical treatment.

In the present invention, I have found that by deaerating the water in a chamber provided within a chemical treating and sedimentation tank of generally conventional type, and employing the steam used for deaerating to preheat the water fed to the tank, efficient and economical operation is obtained. I have also found that if the enclosed deaerating chamber or compartment is provided with a plate or similar element having a plurality or rows of openings over which the water to be treated is distributed uniformly so that intimate contact between the steam and water is insured, very efficient deaeration is effected. This general procedure is readily adapted to conditions in which the water to be deaerated is entirely raw water which must also be subjected to chemical treatment, or is partly raw water and partly condensate which does not require chemical treatment but requires deaeration. Apparatus embodying my invention and in which the various modifications of my invention may be practised is simple in construction and operation and highly efficient.

In order that my invention may be better understood, it will now be described with reference to the accompanying drawings, in which—

Fig. 1 is a side elevational view, with sections broken away, of apparatus constituting an embodiment of my invention adapted for use when all the water deaerated must also be subjected to chemical treatment;

Fig. 2 is a top view, with sections broken away, of the apparatus shown in Fig. 1;

Fig. 3 is a side elevation, with sections broken away, of a form of apparatus embodying my invention adapted for use when only part of the water to be deaerated requires chemical treatment;

Fig. 4 is a top view, with sections broken away, of the apparatus shown in Fig. 3;

Fig. 5 is a side elevation, partially in section and somewhat diagrammatic in nature, of another modification of apparatus adapted to simultaneously treat condensate and raw water;

Fig. 6 is a view similar to Fig. 5 and of the same apparatus, but taken at an angle of 90 degrees from the view shown in Fig. 5;

Fig. 7 is a top view, with portions broken away, of the apparatus shown in Figs. 5 and 6.

Like numerals are used to designate like parts of the apparatus throughout all the drawings.

Referring now more specifically to Figs. 1 and 2, the apparatus there illustrated comprises a closed tank or container 1 which may be mounted on any suitable supports 2. Water to be purified and deaerated is introduced into the tank through a pipe 4 controlled by a float valve 6. After passing the valve 6 the water may be partially heated in a vent condenser 8 having an intake 9 for gases and steam not condensed within the tank. The water is then preferably discharged into the tank through a spray heater 10. If desired, part or all of the water may be by-passed around the vent condenser through a suitable pipe 12.

Chemicals for purifying or otherwise treating the water, such as soda ash and hydrated lime in aqueous dispersion, are introduced into the tank in any convenient manner as through a pipe 14; and filter-wash water may also be introduced into the tank through a pipe 15 for recovery, if desired. The water discharged from the spray heater, with or without preheating in the vent condenser, is heated to substantially the temperature of the steam atmosphere in the tank, and mixes with the introduced chemicals and flows downwardly through the tank around the uptake funnel 17. Most of the sediment formed by the action of the heat and the chemicals continues downward to the conical bottom portion of the tank, where it collects and is then removed through a sludge valve or outlet 19. The level of water in the tank is maintained at the desired height by a float 21 which is operatively connected with the float valve 6 in known manner to control the amount of water admitted. The tank may also be provided with a suitable overflow arrangement as indicated, terminating in a pipe 23 which may be connected to a seal or trap in known manner.

Softened and purified water containing very little suspended matter rises through the uptake cone or funnel 17 and flows through a suitable pipe or conduit 25 into a deaerating section of the tank. I have found it most advantageous to employ a section or chamber defined by a part of the wall of the tank 1, a partition or baffle 27, which extends across the tank and is advantageously curved in shape, and a bottom or floor plate 29. An aperture or opening, indicated at 30, is provided in the wall 27 to permit the passage of steam from this deaerating chamber to the preheating section of the tank, and is advantageously positioned at a point removed some distance from the intake 9 of the vent condenser 8. Within the deaerator chamber there is provided a vertical wall 32 provided with a horizontal baffle 33 extending toward a perforated substantially vertical plate 35. This perforated plate constitutes one wall of a steam chest 36 supplied with steam from any suitable source, such as the pipe 38. The purified water entering the deaerator from the pipe 25 passes under a baffle 40, which may conveniently be a downward continuation of the plate 35. This baffle 40 uniformly distributes the incoming water under the full width of the perforated steam inlet plate 35. The water then flows upwardly in the form of a sheet past the plate in the restricted compartment inside the wall 32, which insures intimate contact with the steam jets entering through the perforations. The horizontal baffle 33 extending toward the steam inlet plate 35 close to the upper row of perforations defines a narrow passage through which all steam and water must pass.

The preheated and chemically treated water enters the deaerator at a temperature only a few degrees below the temperature of the steam at the low pressure ordinarily employed, and very little steam is therefore condensed in raising the temperature of the water to the temperature of the steam. The uncondensed steam, which is by far the greater portion of the steam supplied, rises into the upper part of the deaerating section and passes through the opening 30 in the baffle 27 into the primary heating compartment, where most of the steam is condensed in heating the raw water supplied through the spray heater 10. The oxygen and other non-condensable gases pass from the primary heating compartment of the treater through the intake 9 into the vent condenser 8, where the raw water is given a preliminary heating and most of the steam remaining with the gas is condensed. The fixed gases are vented through the outlet 42. Deaerated water collects in the chamber outside the deaerator proper, and is withdrawn as required through a pipe 43 which may be connected to the boiler feed pump (not shown) or to a filter (not shown) for removing remaining sediment before entering the feed pump.

Figures 1 and 2 illustrate the type of treating apparatus used when all the boiler feed water is made up of raw water and requires softening. Frequently, however, the boiler feed water consists largely of condensate returned from heating systems, processes, etc., which is pure distilled water and does not require softening but does require heating and deaeration. It may also be desirable to return to the feed water system at this point any available condensate collected in high pressure steam traps. Under these circumstances, make-up or raw water is only used in sufficient quantities to supply the boilers after all the available condensate has been used. Figs. 3 and 4 illustrate apparatus which is especially adapted for use under such circumstances.

The apparatus shown in Figs. 3 and 4 comprises a tank with means for feeding water and chemicals thereto and withdrawing sludge and discharging overflow therefrom similar to the corresponding parts of the apparatus shown in Figs. 1 and 2. In this case, however, the bottom plate 29 of the deaerator compartment is ordinarily placed lower in the tank 1, and the baffle or partition 27 is correspondingly longer. Also, there is another transverse or horizontal plate 45 positioned above the plate 29 and the deaerator itself, and provided with a steam vent 46 communicating with an upper compartment. Condensate is delivered from any source or sources where it may be accumulated through a pipe 48 and spray heater 50 or other suitable delivery means into the upper compartment above the plate 45. High temperature condensates from high pressure steam traps and the like may be included with other condensates admitted through the pipe 48, or may be separately admitted through a pipe 51 if desired. All condensate collected in this upper compartment passes directly through a pipe 52 into the deaerator, where it passes under the baffle 40 and is then heated and deaerated by steam admitted through the perforated plate 35, as previously described. This heated and deaerated water collects in the deaerating compartment and is withdrawn as needed for boiler feed through the outlet 43.

The softened or purified make-up water withdrawn through the uptake funnel 17 and the pipe 25 in this instance is not supplied directly to the deaerator, but passes first through a filter 55 and then through a pipe 56 in which the flow is controlled by a float valve 57 operatively connected to a float in the deaerated water storage chamber. The higher level of the water in the preliminary heating and treating section of the tank than in the deaerated water compartment is sufficient to cause a flow of water through the filter 55, in which remaining sediment is removed. The filter 55, shown but diagrammatically in Fig. 3, may be of conventional construction, one suitable type of filter being illustrated and described in the Gibson and Yoder Patent 1,638,803 dated August 9, 1927. However, the condensate section of the treater is also at a higher level, and being directly connected with the deaerator supplies it preferentially with condensate. All the available condensate is therefore deaerated, and chemically treated make-up water is only admitted by the float valve 57 into the deaerator when the supply of condensate is insufficient to maintain the desired level in the deaerated water chamber.

In this form of my apparatus, as well as in the form previously described, the steam employed in deaerating is only condensed to a relatively small extent in the deaerating chamber. Most of the steam passes upwardly through the steam vent 46 into the condensate chamber where a further portion of the steam is condensed in heating the condensate supplied by the spray heater 50. The remaining steam passes through the opening 30 in the baffle or partition 27 as previously described, and is substantially completely condensed in preheating raw water supplied through the spray heater 10. Any remaining steam and the uncondensed gases pass through the intake 9 of the vent condenser 8 as above, and the uncondensable gases are vented through the outlet 42.

When high temperature condensates are admitted to the treater through pipe 51 or otherwise, steam may be evolved or "flashed" in the condensate chamber. This steam is ordinarily condensed, along with the steam from the deaerating chamber, in preheating other condensates and the make-up water. If the make-up is temporarily inadequate to condense all the steam, however, pressure may build up in the communicating steam spaces above the various liquid bodies in the treater. Such pressure may easily exceed the pressure in the main 38 which supplies steam to the deaerator, as this steam is ordinarily the exhaust from turbines, engines, and the like, and is consequently at very low pressure. Under such circumstances, the pressure in the treater tends to force water in the deaerator out through the perforated plate 35 into the supply main 38; and if this is allowed to occur, serious damage to the turbines or engines connected to the steam main may result. To prevent this, I provide a pressure equalizing connection 58 between a steam space in the treater and the supply main 38. This equalizer includes a suitable check valve 59 of conventional construction which prevents the flow of steam from the main into the treater, but permits flow in the opposite direction to equalize the steam pressures. Similar equalizing devices may be employed with any of the other modifications of the invention illustrated in the other figures of the drawings, if desired.

Figs. 5, 6 and 7 illustrate somewhat diagrammatically another form of apparatus similar in function and result to that illustrated in Figs. 3 and 4. The apparatus is arranged for heating and deaerating condensate and for heating, softening and deaerating make-up water, but in this case the make-up water is deaerated before filtration, as in the apparatus illustrated in Figs. 1 and 2, instead of after filtration as in the apparatus shown in Figs. 3 and 4.

In this form of my invention the deaerating chamber is separated from the remainder of the tank 1 by a partition 27 and a bottom plate 29, as before, and is bounded above by a plate 45 serving as the bottom of the condensate chamber. The deaerator proper is similar in construction to those previously described, but in addition it and the chamber are divided into two parts by a vertical partition or plate 60 extending above the high-water level in the deaerated water chamber but open at the top, or in other words terminating below the bottom plate 45 of the condensate chamber. The condensates collect in the upper chamber as described in connection with Fig. 3, and are supplied by a direct pipe connection 62 to the deaerator on one side of the dividing plate 60. Purified or softened make-up water, usually containing a small amount of suspended matter, is withdrawn from the softening section through the uptake funnel 17 and the pipe 25 and supplied to the deaerator on the opposite side of the plate 60 from the condensate line 62. The water in both sections of the deaerator is freed from oxygen and other gases by steam, as previously described. The steam may conveniently be supplied through a single inlet 38. Uncondensed steam and gases from both sections of the deaerator pass upwardly through the steam vent 46 into the condensate chamber, where part of the steam is condensed in heating condensate delivered into the condensate chamber by the spray 50 or otherwise. The remaining uncondensed steam passes from the condensate chamber into the raw water or preheating section of the treater, where it is utilized in heating the make-up water. Uncondensed gases are vented as before. A pressure equalizing connection 58 may be provided between the condensate chamber and the steam main, if desired.

Deaerated make-up water passes from the deaerated water storage on one side of the plate 60 through a pipe 64 and filter 65 and thence to the boiler feed pump 66. Filter 65 may be of the type shown in the above mentioned Gibson and Yoder patent. Condensate passes from the deaerated condensate storage section through a pipe 68 to the boiler feed line on the outlet side of the filter 65, and being available at higher pressure than the filtered make-up water, it is taken preferentially by the pump. The softened, filtered make-up water is only consumed in such quantities as are required to supply the deficiency of condensate. This modification permits the use of a shorter sedimentation tank, and is therefore somewhat less expensive in construction than the design shown in Figs. 3 and 4.

All of these modifications of my invention have distinct advantages in operation and economy over equipment for similar purposes heretofore available. When oxygen is removed from water by heating with steam, it is necessary that the water be heated to the full temperature of the steam at the prevailing pressure; that the oxygen partial pressure be reduced to substantially zero; and that the water be washed or scrubbed with a large volume of gas containing no oxygen, so as to wash away any oxygen that has been made insoluble by heating and the low partial pressure. These desiderata are all obtained in the various embodiments of my invention, because the water entering the deaerator has already been heated to a temperature within a few degrees of the steam temperature and only a little steam is required to bring the water to the desired final temperature. As a result, very little steam is condensed in the deaeration step, leaving a large volume for scrubbing, and only a relatively small total steam consumption is required in the operation of my treating apparatus. As an example, the results obtained in the treatment of raw water entering the softener at a temperature of 60°, when employing exhaust steam at a pressure of about 2 pounds gage, which has a temperature of about 219° F., will be described. Under these conditions, approximately 1 pound of steam will be required for heating every 7 pounds of water, or approximately 200 cubic feet of steam for 1 cubic foot of water. Since some oxygen is removed in the primary heating stage, the water entering the deaerator usually contains approximately 0.3 cc. oxygen per liter, or 3 parts of oxygen for 10,000 parts of water by volume. Since the volume of steam passing through the deaerator is approximately 200 times the volume of the water, it is about 700,000 times the volume of the oxygen. It necessarily follows that the oxygen partial pressure is substantially zero, and that the water is scrubbed with a large volume of substantially oxygen-free steam, resulting in an extraordinarily low oxygen content of the water leaving the deaerator compartment, in the order of 0.01 cc. per liter.

My invention has been described herein with special reference to certain embodiments thereof which are now considered particularly advantageous, but it is to be understood that my invention is not limited to these specific embodiments except as defined by the accompanying claims.

What I claim is:

1. Water purifying and deaerating apparatus comprising, in combination, a tank enclosing a sedimentation space constituting the major portion of the tank interior, partitions subdividing the upper portion of the tank and defining, with the tank walls, a deaerating section and a treating section opening at its lower end into said sedimentation space, means for supplying to said treating section water and water softening chemicals required for the softening thereof, a conduit connecting the sedimentation space with the deaerating section, for delivering softened water from said sedimentation space to said deaerating section by gravitational flow, gas-removing means in said deaerating chamber including a vertical plate having holes in vertically spaced rows, means for delivering steam through said holes, and baffle means adjacent said plate and adapted to guide a uniformly wide restricted upward flow of water delivered to said deaerating section past said plate and in intimate contact with steam delivered through said holes, and means for conducting steam passing uncondensed from said deaerating section to the water supplied to said treating section.

2. Water deaerating apparatus comprising an enclosed tank, means for spraying water into the upper portion of said tank, a water supply pipe connected to said spraying means, a steam chest within said tank, a substantially vertical perforated wall for said steam chest, a plate parallel to said wall, a passage between said wall and said plate, means for conducting to the lower end of said passage water sprayed into said tank by said spraying means, means for supplying steam to said steam chest for discharge through said perforated wall to deaerate water in said passage, a deaerated water storage compartment within said tank and communicating with the upper end of said passage, means for conducting steam from the upper end of said passage to the upper portion of said tank to heat water sprayed into said tank, a vent condenser connected with said supply pipe and the upper portion of said tank to preheat water supplied to said spraying means, a valve in said supply pipe, a float in said storage compartment for operating said valve, and an outlet for said storage compartment.

3. Apparatus for heating and removing dissolved gases from boiler feed water and the like, comprising a chamber, a bottom for the chamber, a steam chest within and adjacent one side of said chamber and spaced from the bottom thereof and having a wall, perforations in said wall directed toward another side of said chamber, a plate parallel with said wall, members connecting said plate and said wall to form a passage, a baffle extending from said plate toward said wall adjacent the upper perforations to restrict the flow of fluids through said passage, means for delivering water to be heated and deaerated to said chamber below said steam chest under sufficient pressure to cause it to flow upwardly through said passage past said perforations, and means for supplying steam to said steam chest under sufficient pressure to cause it to flow through said perforations and the water in said passage.

4. Water heating and deaerating apparatus comprising a tank enclosing a sedimentation space, a water inlet at the top of the tank, partitions cooperating with a wall of said tank to define a chamber within the tank, a steam chest within said chamber and spaced from the bottom of the chamber and adjacent said wall of the tank and having a substantially vertical wall spaced from the tank wall, said vertical wall having perforations therein and having a continuation extending downwardly below adjacent portions of the steam chest, a plate substantially parallel with said vertical wall of the steam chest, means connecting the plate and the wall to form a passage extending from the bottom of the chamber to a level above the said perforations and provided with a baffle extending toward said vertical wall of the steam chest, means for delivering preheated water from said sedimentation space into the chamber below said steam chest under sufficient pressure to cause it to flow under the downward continuation of the said vertical wall of the steam chest and upward through the passage along said vertical wall, means for delivering steam to said steam chest under sufficient pressure to cause it to flow through said perforations and upwardly through the water in said passage in amounts greater than can be condensed by said water, and means for delivering the uncondensed portion of said steam to said water inlet to preheat the incoming water by condensation of said uncondensed steam.

5. Water heating, purifying and deaerating apparatus comprising a tank enclosing a sedimentation space, partitions dividing the upper portion of said tank into a deaerating chamber, a condensate chamber, and a treating chamber opening below into said sedimentation space, a steam space in the upper portion of the treating chamber, said condensate chamber being positioned above said deaerating chamber and both being beside said treating chamber, means for delivering make-up water and chemicals for the treatment thereof to said treating chamber, means for delivering condensate to said condensate chamber, means for supplying steam to said deaerating chamber to remove dissolved gases from water delivered thereto by contact with said steam, means for delivering condensate directly from said condensate chamber to said deaerating chamber, means for delivering purified make-up water from said sedimentation space to said deaerating chamber in amounts sufficient to maintain the desired water level therein, and means for delivering uncondensed steam from said deaerating chamber to said steam space, to heat water admitted to the treating chamber.

6. Water purifying and deaerating apparatus comprising a tank enclosing a sedimentation space and a steam space near the top of the tank, partitions dividing the upper portion of said tank into a treating chamber and a deaerating chamber, the steam space communicating with said treating chamber and said deaerating chamber, a conduit connecting the sedimentation space with the deaerating chamber, means for admitting steam into the lower portion of said deaerating chamber, a steam inlet conduit connected with said means, a pressure equalizing connection interconnecting said steam space and said steam inlet conduit, and a check valve in said equalizing connection preventing flow from said steam inlet conduit into said steam space.

7. Water heating, purifying and deaerating apparatus comprising a tank enclosing a sedimentation space, partitions dividing the upper portion of said tank into a deaerating chamber, a condensate chamber, and a treating chamber opening below into said sedimentation space, said condensate chamber being positioned above said deaerating chamber and both being beside said treating chamber, means for delivering make-up water and water treating chemicals for the treatment thereof to said treating chamber, means for delivering condensate to said condensate chamber, a substantially vertical plate having perforations and mounted in said deaerating chamber, means adapted to effect a flow of steam through the perforations, means adapted to effect intimate contact of liquids delivered to said chamber with said steam, means for delivering condensate directly from said condensate chamber to said deaerating chamber, a filter, conduits for delivering make-up water from said sedimentation space to said filter and thence to said deaerating chamber in amounts sufficient to maintain the desired water level therein, and means for delivering uncondensed steam from said deaerating chamber to said condensate chamber and said treating chamber to preheat condensate and water delivered thereto.

8. Water purifying and deaerating apparatus comprising a tank enclosing a sedimentation space, partitions dividing the upper part of said tank into a condensate chamber and a deaerating chamber below said condensate chamber and a treating chamber beside said condensate chamber and said deaerating chamber and opening at the bottom into said sedimentation space, a vertical wall dividing said deaerating chamber into two parts, a passage connecting one of said parts with said condensate chamber to permit the flow of condensate to said one part, another passage connecting the other of said parts with said sedimentation space to permit the gravity flow of treated water to said other part, means for intimately contacting steam with aqueous fluid in both of said parts of the deaerating chamber to remove dissolved gases from the fluid, means for conducting steam from said deaerating chamber into said condensate chamber and thence into said treating chamber to maintain an atmosphere of steam above the fluid throughout the tank, means for spraying condensate into the steam atmosphere in the condensate chamber, means for spraying make-up water into the steam atmosphere in the treating chamber, means for withdrawing uncondensed gases from the treating chamber, and means for withdrawing deaerated water from both parts of the deaerating chamber.

9. The process of purifying and deaerating boiler feed water and the like, which comprises effecting a restricted uniform vertically upward directed flow of a confined relatively thin sheet of water and simultaneously passing a plurality of horizontally directed steam jets into said sheet at right angles thereto, said steam being supplied in such excess of the amount required to heat said sheet of water to substantially the steam temperature that dissolved gases are removed from the water, separating said excess of steam from said sheet of water, condensing said excess of steam by contact with said water before it enters into said restricted upward flow, and segregating removed uncondensible gases from contact with the water.

10. The process of purifying, heating and deaerating boiler feed water and the like, which comprises softening raw water by chemical softening treatment and preheating it, mixing only sufficient of the resulting preheated, softened water with preheated condensate to maintain the desired supply of boiler feed water, removing dissolved gases from the mixed preheated condensate and preheated, softened raw water by intimate contact with steam in excess of the amount required to heat them to the steam temperature, and condensing excess steam by contact with raw water and condensate to preheat said raw water and condensate.

11. The process of heating, purifying and deaerating boiler feed water and the like, which comprises preheating raw water, softening it by chemical softening treatment, preheating condensate returned from steam utilizing equipment, deaerating the preheated raw water and condensate by contact with steam in excess of the amount required to heat them to the steam temperature, condensing excess steam by contact with raw water and said condensate to preheat said raw water and condensate, filtering the heated, softened and deaerated raw water, and mixing only sufficient of the heated, softened, deaerated and filtered raw water with heated and deaerated condensate to maintain the desired supply of boiler feed water.

JOSEPH D. YODER.